(12) United States Patent  
Adams

(10) Patent No.: US 9,121,621 B2  
(45) Date of Patent: Sep. 1, 2015

(54) AUTOMOBILE INTERIOR PASSIVE ENVIRONMENTAL MODERATOR

(71) Applicant: Thomas M. Adams, San Antonio, TX (US)

(72) Inventor: Thomas M. Adams, San Antonio, TX (US)

( * ) Notice: Subject to any disclaimer, the term of this patent is extended or adjusted under 35 U.S.C. 154(b) by 66 days.

(21) Appl. No.: 13/874,455

(22) Filed: Apr. 30, 2013

(65) Prior Publication Data

US 2014/0145357 A1 May 29, 2014

Related U.S. Application Data

(60) Provisional application No. 61/640,543, filed on Apr. 30, 2012.

(51) Int. Cl.
| | |
|---|---|
| *F24F 6/08* | (2006.01) |
| *B60H 1/32* | (2006.01) |
| *B60H 3/02* | (2006.01) |
| *F24F 5/00* | (2006.01) |

(52) U.S. Cl.
CPC ............... *F24F 6/08* (2013.01); *B60H 1/3202* (2013.01); *B60H 3/022* (2013.01); *B60H 2003/026* (2013.01); *F24F 5/0035* (2013.01); *F24F 2005/0064* (2013.01)

(58) Field of Classification Search
CPC ................. B60H 1/3202; B60H 3/022; B60H 2003/026; F24F 5/0035; F24F 6/08; F24F 2005/0064

USPC .......... 261/153, 101, 104, 107, 112.1, DIG. 3, 261/DIG. 43; 239/34, 44, 53, 56

See application file for complete search history.

(56) References Cited

U.S. PATENT DOCUMENTS

| | | | | | |
|---|---|---|---|---|---|
| 527,291 | A | * | 10/1894 | Robinson | 239/44 |
| 1,281,390 | A | * | 10/1918 | Kelling | 239/44 |
| 1,826,115 | A | * | 10/1931 | Ziebarth | 239/35 |
| 2,164,566 | A | * | 7/1939 | Bunting | 261/103 |
| 2,303,073 | A | * | 11/1942 | Brown | 239/53 |
| 2,819,135 | A | * | 1/1958 | Shapiro | 312/31.1 |
| 2,850,321 | A | * | 9/1958 | Hoffman | 239/56 |
| 4,157,787 | A | * | 6/1979 | Schwartz | 239/56 |
| 4,206,570 | A | * | 6/1980 | Cooper | 47/71 |
| 4,583,686 | A | * | 4/1986 | Martens et al. | 239/35 |
| 4,744,514 | A | * | 5/1988 | Gadoua | 239/36 |
| 4,940,272 | A | * | 7/1990 | Weick | 296/97.5 |
| 5,121,881 | A | * | 6/1992 | Lembeck | 239/44 |
| 5,534,229 | A | * | 7/1996 | Nomura et al. | 422/123 |
| 5,946,931 | A | * | 9/1999 | Lomax et al. | 62/304 |
| 6,444,963 | B1 | * | 9/2002 | Donahue | 219/678 |
| 6,695,272 | B1 | * | 2/2004 | Bomgaars et al. | 248/346.11 |
| 6,938,832 | B2 | * | 9/2005 | Sada | 239/41 |

(Continued)

*Primary Examiner* — Charles Bushey

(74) *Attorney, Agent, or Firm* — Kammer Browning PLLC

(57) ABSTRACT

A structured cover that is placed on an automobile's dashboard (and/or the rear window shelf) and provided with a quantity of water, or other suitable liquid, that on heating will evaporate into the interior air of the vehicle. The device includes a water impermeable layer that lays against and partially covers the top surface of the dashboard and/or rear shelf and a water wicking layer over the impermeable layer that may be saturated with water (on a repeated basis as necessary) and serve as a reservoir for the evaporative process to be carried out. The multilayered surface may be manually refilled with water (or other suitable liquid) from a hand held container or may be automatically refilled from reservoirs structured in fluid connection to the evaporative surface.

20 Claims, 3 Drawing Sheets

(56) References Cited

U.S. PATENT DOCUMENTS

| | | | |
|---|---|---|---|
| 7,524,463 B2 * | 4/2009 | Adair et al. | 422/125 |
| 8,191,796 B2 * | 6/2012 | Lammert et al. | 239/57 |
| 2011/0089255 A1 * | 4/2011 | Kolich | 239/34 |
| 2011/0239538 A1 * | 10/2011 | Hsu | 47/66.6 |

* cited by examiner

AUTOMOBILE INTERIOR PASSIVE ENVIRONMENTAL MODERATOR

CROSS REFERENCES TO RELATED APPLICATIONS

This application claims the benefit under Title 35 United States Code §119(e) of U.S. Provisional Application 61/640,543 filed Apr. 30, 2012, the full disclosure of which is incorporated herein by reference.

BACKGROUND OF THE INVENTION

1. Field of the Invention

The present invention relates generally to automotive products and accessories. The present invention relates more specifically to a passive system for evaporative cooling and humidifying of the interior of an automobile or a truck.

2. Description of the Related Art

Whenever the sun's rays penetrate the windshield of an automobile, whether the vehicle is parked or in motion, the dashboard accumulates heat, at times to a degree that the surface of the dashboard is not touchable. Similar effects occur through most angled rear windows positioned over the generally horizontal rear shelf immediately behind the rear seats in many vehicles. Air conditioning provides cooling to the interior of the vehicle, but as long as the sun's rays are striking the dashboard and/or the rear window shelf, even with the air conditioner on full, these sunlit horizontal surfaces (the dashboard and the rear window shelf) absorb and retain a significant amount of heat that, in turn, continues to subvert the effectiveness of the air conditioning system.

In addition, air conditioning systems withdraw moisture from the air that is being cooled, causing the interior air of the vehicle to become inordinately dry, a situation that is usually not consciously adverted to, but once pointed out, becomes all too noticeable as contributing to discomfort and fatigue. The combination of the air conditioner working harder to cool the air as it confronts the ongoing dashboard-created heat, and the resulting dryness of the air, can lead to dehydration of the occupants of the vehicle, accelerate fatigue, and dry out the mucous membranes of the nose and mouth of each occupant. Most people remark of fatigue at the end of a long trip, a fatigue that is noticeably more severe after traveling on a sunny day.

It would be beneficial to have a device that would passively (without the need for electrical power or the need to draw energy from the engine of the vehicle) put moisture into the air within a vehicle. It would be beneficial if this could occur both while the vehicle is stationary (without the engine or air conditioner running) and when the vehicle is in motion (when the vehicle heater or air conditioner is removing moisture from the air). It would be desirable if such a device could function as a reaction to the heat absorption that readily occurs through the windshield and/or the rear window in a vehicle. It would further be desirable if such a device were easy to install, easy to remove, easy to maintain, and easy to clean when necessary.

SUMMARY OF THE INVENTION

In fulfillment of the above and further objectives the present invention provides for a structured cover that is placed on an automobile's dashboard (and/or the rear window shelf) and provided with a quantity of water, or other suitable liquid, that on heating will evaporate into the interior air of the vehicle. With such a cover, the heat of the sun's rays will do two things that add to the comfort of the occupants of a closed vehicle that is equipped with an air conditioning system that is in operation. First, the heat of the sun's rays will cause the water in/on the cover to evaporate slowly and continuously, thus cooling the dashboard (and/or rear window shelf) while creating moisture to moderate the dryness of the interior air. Second, some of that moisture will be condensed by the air conditioner, a process that will increase the effectiveness of the air conditioning operation. The device includes a water impermeable layer that lays against and partially covers the top surface of the dashboard and/or rear shelf and a water wicking layer over the impermeable layer that may be saturated with water (on a repeated basis as necessary) and serve as a reservoir for the evaporative process to be carried out. This open pad or mat may preferably be shaped to fit various dashboards and rear window shelves. Alternate embodiments allow the user to customize the shape and size of the pad. The multilayered surface may be manually refilled with water (or other suitable liquid) from a hand held container or may be automatically refilled from reservoirs structured in fluid connection to the evaporative surface.

DETAILED DESCRIPTION OF THE PREFERRED EMBODIMENTS

Figure 1:
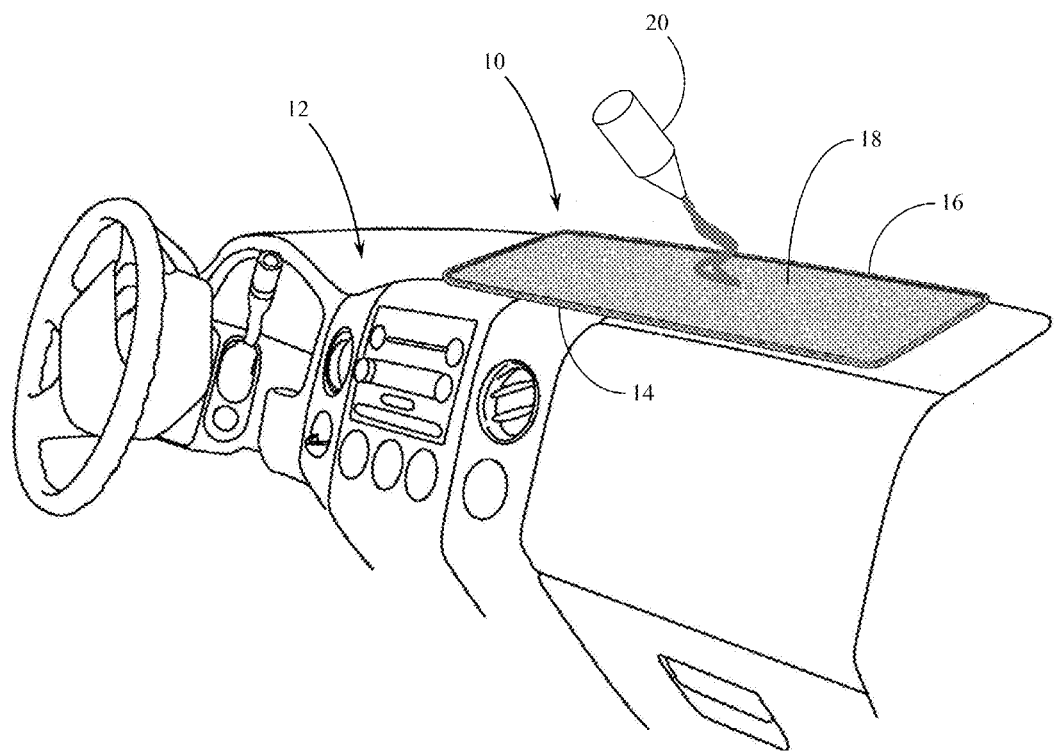
FIG. 1 is a perspective view of a typical automobile dashboard with a preferred embodiment of the passive humidifier.

Reference is made first to FIG. 1 which is a perspective view of a typical automobile dashboard showing the placement of a first preferred embodiment of the passive humidifier of the present invention. The components and structures associated with implementation of the present invention in conjunction with the front dashboard of a vehicle are equally applicable to implementation on other generally horizontal surfaces within the vehicle, such as rear window shelves and sills. Passive humidifier 10 is shown positioned on a standard sized automobile dashboard 12 and includes a slip resistant base 14 and a wicking, water impervious fabric 18. Fabric 18 is preferably a material that in a woven or sponge state can receive, hold, and wick water through the material without dissolving or otherwise degrading the material. Any of a number of polymer woven fabrics or porous solids materials can provide the necessary balance of characteristics that allow for retention of water and its evaporation by wicking action.

The fabric 18 may preferably be constructed with a raised edge 16 to prevent moisture from seeping off of the fabric material 18. Water, such as from a dispensing bottle 20 is placed onto fabric 18 where it is held within the fabric material 18 on top of the waterproof base 14 surrounded by the raised edge 16. In this manner, a quantity of water may be subjected to the sun's rays and absorb the heat thereof so as to evaporate into the interior of the automobile. As indicated above, this process of evaporation facilitates the comfort of the occupants of the vehicle.

Placement, removal, and maintenance of the device of the present invention is made easy by its convenient accessibility. In addition, optimal placement of the device is well removed from any chance of interference with other components and functions of the typical dashboard, such as airbags on the front or sensors near the windshield. Other elements on the dashboard or rear window shelf (such as speakers, etc.) may be accommodated by custom shapes and sizes or by use of the customizable configuration of the device described in more detail below.

Figure 2:
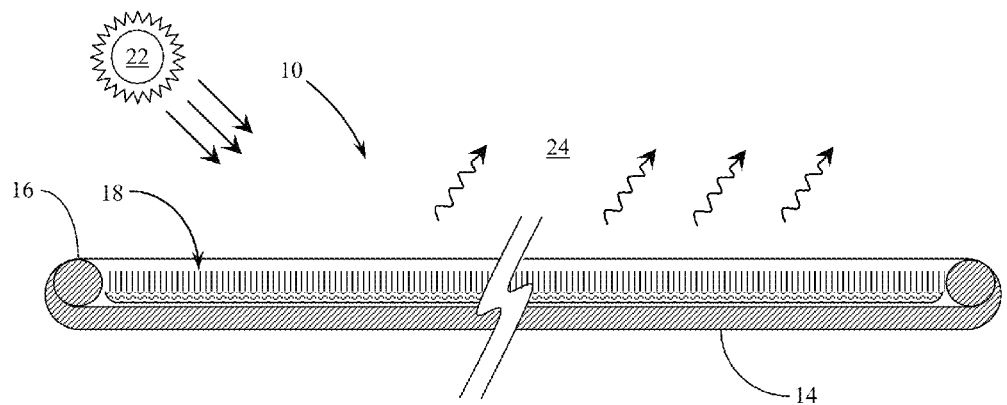
FIG. 2 is a cross-sectional view of a first preferred embodiment of the present invention.

FIG. 2 is a partial cross-sectional view of a first preferred embodiment of the present invention showing the arrangement of layers in the passive humidifier cover and the manner in which the sun's rays may cause evaporation of water held within the cover. In FIG. 2, passive humidifier 10 is shown to be made up of slip resistant bottom 14 which is preferably a water impermeable sheet having a perimeter raised edge 16 (also water impermeable) that allows a generous quantity of water to be retained within the confines of the cover. The sun's energy 22 falls on passive humidifier 10 and is absorbed by the moisture present in the wicking fabric 18 positioned over the top of base 14. By absorbing heat, the water in the wicking fabric 18 turns to vapor 24, and as described above, facilitates both the cooling of the dashboard and humidifying the air for the comfort of the vehicle occupants.

Figure 3:
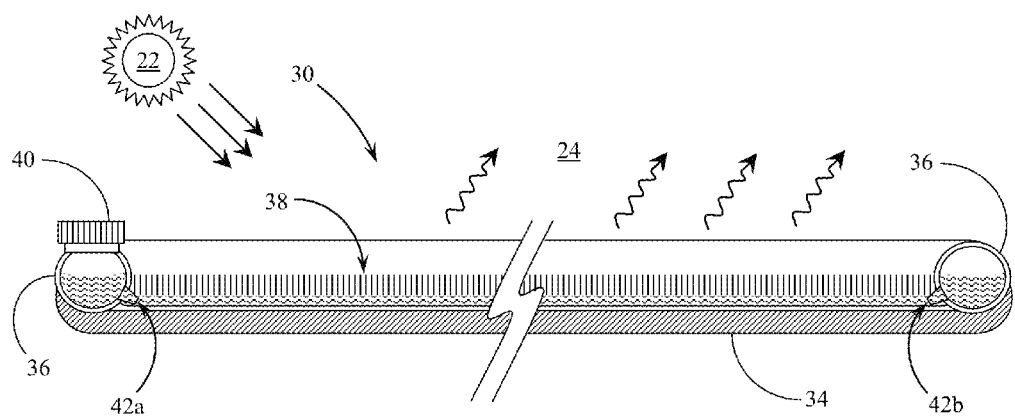
FIG. 3 is a cross-sectional view of a second preferred embodiment of the present invention.

FIG. 3 is a cross-sectional view of an alternate preferred embodiment of the present invention wherein a supply of water may be provided to the passive humidifier so as to reduce the frequency with which additional water must be added. Passive humidifier cover 30 shown in FIG. 3 again retains a waterproof slip resistant bottom 34 on top of which is positioned wicking fabric 38 into which water is drawn for the purposes of being heated and evaporated as described above. In the second embodiment shown in FIG. 3, the raised perimeter edge is replaced with a tubular reservoir 36 that retains a quantity of water that may be drawn into impervious fabric 38 through seepage ports 42a & 42b as shown. Various seepage ports may be constructed through the walls of the tubular water reservoir 36 that forms the perimeter edge of the cover. The water reservoir may be refilled through an opening under removable cap 40 positioned at one location on water reservoir 36.

The dashboard moderator cover of the present invention should be made of a material that has a wicking property. The cover may be made in two or more sizes so as to fit a wide variety of vehicles and have a means of keeping the cover in place (non-slip) on the dashboard. (Manufacturers of automobiles could integrate the cover into the design of the dashboard.) The water coolant, or an alternative appropriate liquid, may be delivered to, and/or through, the dashboard cover either externally by using a spray bottle, or internally from a built-in vessel with a dispersant means as described above.

Although water would be the preferred primary ingredient in the fluid to be evaporated with the device of the present invention various additives may be mixed in to serve additional functions. A disinfectant and/or antibacterial compound may be added to the fluid to inhibit the growth of bacterial (in the moist environment of the device) and reduce the need to periodically clean the device between uses. A fragrance compound may be added to instill a fragrant smell into the air, carried with the evaporation of the water. Anti-fogging agents and other beneficial but non-toxic and non-irritating compounds may further be added to the evaporative fluid.

Figure 4A:
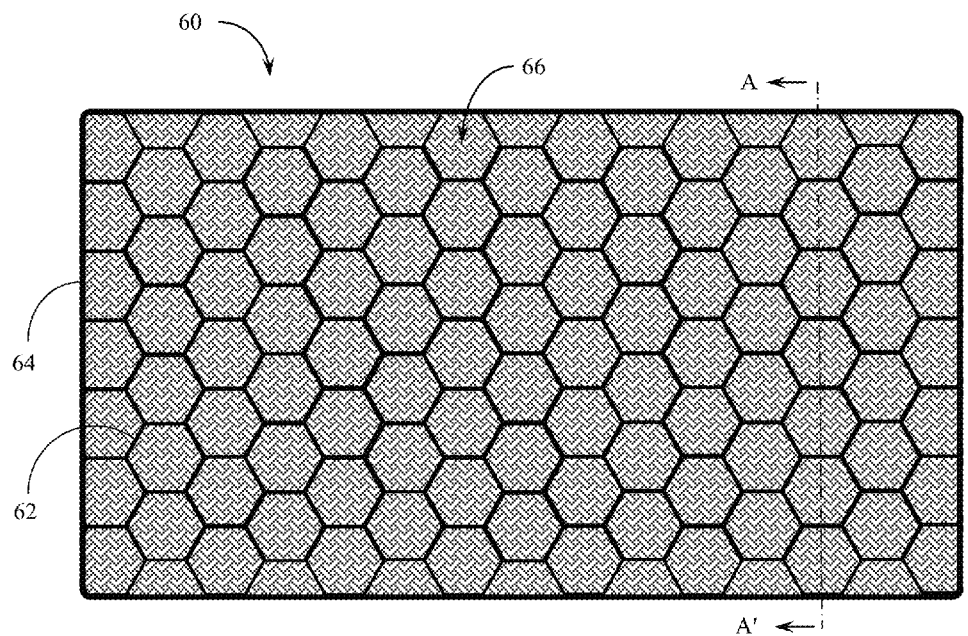
FIGS. 4A & 4B are top plan and cross-sectional views of a further alternate embodiment of the present invention.
Figure 4B:
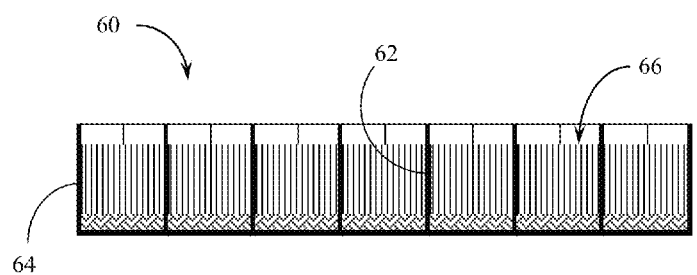

FIGS. 4A & 4B are top plan and cross-sectional views of a further alternate embodiment of the present invention. In this simplified embodiment passive humidifier 60 is constructed of a sheet of cells 62 that allow the pad to be cut by the user to customize the fit. Each cell 62 holds a section 66 of wicking fabric or wicking material as described above, albeit not in fluid communication with the entire mat or pad. The entire pad or pad section may initially include an outer wall 64, and multiple pads may be positioned adjacent each other and trimmed as necessary to provide a custom fit. One downside to this construction is the inability to refill the humidifier at a single point as water would need to be poured or sprayed over and into the multiple cells. In addition it would be difficult to implement the automatic refill reservoir system described above. Nonetheless, there may be situations where customization of the humidifier, either by placement of multiple pads and/or the trimming of a pad to fit, might be beneficial.

Although the present invention has been described in conjunction with a number of preferred embodiments, those skilled in the art will recognize modifications to these embodiments that still fall within the scope of the present invention. Because of the standardized size of a motor vehicle dashboard such as utilized in the present invention, the dimensions may be structured as simply small, medium, and large. Alternately, the present invention may be implemented through the manufacture and sale of custom produced sizes. Multiple smaller pads may be positioned together to cover a larger or discontinuous dashboard or window shelf area.

I claim:

1. A device for moderating the temperature and humidity of the air inside a motor vehicle, the motor vehicle having a generally horizontal dashboard and/or a rear window shelf, the device comprising:
   (a) a fluid impermeable layer of material formed into a generally flat non-rigid pad positioned on the top surface of the generally horizontal dashboard or rear window shelf, the pad further comprising a raised perimeter edge, the pad with perimeter edge forming a fluid container with an open top, a wide base, and containment walls short relative to the dimensions of the top and base;
   (b) a fluid wicking layer of material positioned to generally cover and overlay the fluid impermeable layer of material of the generally flat non-rigid pad and to fit within the confines of the raised perimeter edge; and
   (c) a quantity of evaporative fluid contained within the confines of the fluid container formed by the pad with perimeter edge, the quantity of evaporative fluid dispersed within the fluid wicking layer of material;
   whereby the evaporative fluid dispersed within the wicking layer of material evaporates into the surrounding air by solar heating experienced through the windshield and/or the rear window of the vehicle, thereby moderating both the temperature and humidity of the interior of the vehicle.

2. The device of claim 1 further comprising a fluid reservoir in flow communication with the fluid wicking layer of material, wherein additional evaporative fluid may flow from the reservoir into the fluid wicking layer to replace fluid evaporated from the wicking layer.

3. The device of claim 2 wherein the fluid reservoir is incorporated into the raised perimeter edge of the generally flat non-rigid pad and the containment walls formed by the raised perimeter edge comprise an interior wall and an exterior wall, the interior wall having a plurality of seepage ports providing the flow communication between the reservoir and the fluid wicking layer of material.

4. The device of claim 3 wherein the fluid reservoir further comprises a fill port with a removable cap, wherein the reservoir may be refilled through the fill port.

5. The device of claim 1 wherein the fluid wicking layer comprises at least one layer of woven fiber fabric.

6. The device of claim 5 wherein the woven fiber fabric comprises polymer fibers individually impervious to water but collectively structured to receive, hold, and wick water through the fabric.

7. The device of claim 1 wherein the fluid wicking layer comprises a layer of porous solid material.

8. The device of claim 1 wherein the fluid impermeable layer of material formed into a generally flat non-rigid pad comprises an outer face having a slip resistant surface.

9. The device of claim 1 wherein the quantity of evaporative fluid comprises water and an antibacterial compound.

10. The device of claim 1 wherein the quantity of evaporative fluid comprises water and a fragrance compound.

11. A device for moderating the temperature and humidity of the air inside a motor vehicle, the motor vehicle having a generally horizontal dashboard and/or a rear window shelf, the device comprising:
   (a) a fluid impermeable layer of material formed into a generally flat non-rigid pad positioned on the top surface of the generally horizontal dashboard or rear window shelf, the pad further comprising a raised perimeter edge, the pad with perimeter edge forming a fluid container with an open top, a wide base, and containment walls short relative to the dimensions of the top and base;
   (b) a fluid wicking layer of material positioned to generally cover and overlay the fluid impermeable layer of material of the generally flat non-rigid pad and to fit within the confines of the raised perimeter edge; and
   (c) a fluid reservoir in flow communication with the fluid wicking layer of material;
   wherein a quantity of evaporative fluid may be dispersed within the wicking layer of material where it may evaporate into the surrounding air by solar heating experienced through the windshield and/or the rear window of the vehicle, thereby moderating both the temperature and humidity of the interior of the vehicle, and wherein additional evaporative fluid may be stored in the fluid reservoir and flow from the reservoir into the fluid wicking layer to replace fluid evaporated from the wicking layer.

12. The device of claim 11 wherein the fluid reservoir is incorporated into the raised perimeter edge of the generally flat non-rigid pad and the containment walls formed by the raised perimeter edge comprise an interior wall and an exterior wall, the interior wall having a plurality of seepage ports providing the flow communication between the reservoir and the fluid wicking layer of material.

13. The device of claim 12 wherein the fluid reservoir further comprises a fill port with a removable cap, wherein the reservoir may be refilled through the fill port.

14. A device for moderating the temperature and humidity of the air inside a motor vehicle, the motor vehicle having a generally horizontal dashboard and/or a rear window shelf, the device comprising:
   (a) a fluid impermeable layer of material formed into a generally flat non-rigid pad positioned on the top surface of the generally horizontal dashboard or rear window shelf, the pad comprising a base and a plurality of open top cells formed by raised cell walls extending up from the base, the cellular pad forming a plurality of fluid containers each with an open top and closed base and walls;
   (b) a fluid wicking layer of material positioned to generally cover and overlay the fluid impermeable layer of material of the generally flat non-rigid pad and segmented to fit within the confines of each of the open top cells; and
   (c) a quantity of evaporative fluid contained within the confines of the plurality of fluid containers formed by the cellular pad, the quantity of evaporative fluid dispersed within the segmented fluid wicking layer of material;
   whereby the evaporative fluid dispersed within the wicking layer of material evaporates into the surrounding air by solar heating experienced through the windshield and/or the rear window of the vehicle, thereby moderating both the temperature and humidity of the interior of the vehicle.

15. The device of claim 14 wherein the fluid wicking layer comprises at least one layer of woven fiber fabric.

16. The device of claim 15 wherein the woven fiber fabric comprises polymer fibers individually impervious to water but collectively structured to receive, hold, and wick water through the fabric.

17. The device of claim 14 wherein the fluid impermeable layer of material formed into a generally flat non-rigid pad comprises an outer face having a slip resistant surface.

18. The device of claim 14 wherein the quantity of evaporative fluid comprises water and an antibacterial compound.

19. The device of claim 14 wherein the quantity of evaporative fluid comprises water and a fragrance compound.

20. The device of claim 14 wherein the fluid impermeable layer of material and the fluid wicking layer of material may be cut in size and shape to custom fit the dashboard and/or rear window shelf of a specific motor vehicle without compromising the fluid containment integrity of a majority of the cells in the cellular pad structure.

* * * * *